United States Patent
Kwon et al.

(10) Patent No.: US 8,937,914 B2
(45) Date of Patent: Jan. 20, 2015

(54) METHOD AND APPARATUS FOR TRANSCEIVING DATA IN A WIRELESS COMMUNICATION SYSTEM

(75) Inventors: Yeong Hyeon Kwon, Anyang-si (KR); Dragan Vujcic, Limours (FR); Sung Ho Moon, Anyang-si (KR); Seung Hee Han, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 13/498,899

(22) PCT Filed: Jun. 18, 2010

(86) PCT No.: PCT/KR2010/003966
§ 371 (c)(1),
(2), (4) Date: Mar. 28, 2012

(87) PCT Pub. No.: WO2011/040696
PCT Pub. Date: Apr. 7, 2011

(65) Prior Publication Data
US 2012/0182959 A1 Jul. 19, 2012

Related U.S. Application Data

(60) Provisional application No. 61/246,540, filed on Sep. 29, 2009.

(51) Int. Cl.
*H04W 4/00* (2009.01)
*H04L 27/00* (2006.01)
*H04L 1/00* (2006.01)

(52) U.S. Cl.
CPC .......... *H04L 27/0012* (2013.01); *H04L 1/0047* (2013.01)

USPC .......... 370/329; 370/380; 370/343; 370/330; 370/336; 455/101; 455/115.1; 375/260; 375/295; 375/240.04

(58) Field of Classification Search
USPC ........................................... 370/329
See application file for complete search history.

(56) References Cited

U.S. PATENT DOCUMENTS

| | | | |
|---|---|---|---|
| 8,149,810 B1 * | 4/2012 | Narasimhan et al. | 370/343 |
| 2002/0110138 A1 * | 8/2002 | Schramm | 370/430 |
| 2002/0118666 A1 | 8/2002 | Stanwood et al. | |
| 2002/0183010 A1 * | 12/2002 | Catreux et al. | 455/67.1 |
| 2004/0110510 A1 | 6/2004 | Jeon et al. | |
| 2005/0152327 A1 * | 7/2005 | Erlich et al. | 370/343 |
| 2009/0219875 A1 | 9/2009 | Kwak et al. | |
| 2010/0067591 A1 * | 3/2010 | Luo et al. | 375/260 |
| 2010/0284359 A1 * | 11/2010 | Kim et al. | 370/329 |
| 2011/0216733 A1 * | 9/2011 | Han et al. | 370/329 |
| 2012/0099544 A1 * | 4/2012 | Pajukoski et al. | 370/329 |
| 2012/0307779 A1 * | 12/2012 | Noh et al. | 370/329 |
| 2014/0233541 A1 * | 8/2014 | Kim et al. | 370/336 |

* cited by examiner

*Primary Examiner* — Faruk Hamza
*Assistant Examiner* — Shah R Zaman
(74) *Attorney, Agent, or Firm* — Lee, Hong, Degerman, Kang & Waimey

(57) ABSTRACT

The present invention relates to a method and apparatus for transceiving data in a wireless communication system. A method for receiving data in a wireless communication system according to one aspect of the present invention is configured such that a base station receives, from a mobile station, a signal including information and data on the transmission mode which the mobile station has selected in accordance with a channel status, and decodes the data in accordance with the transmission mode.

2 Claims, 6 Drawing Sheets

METHOD AND APPARATUS FOR TRANSCEIVING DATA IN A WIRELESS COMMUNICATION SYSTEM

CROSS-REFERENCE TO RELATED APPLICATIONS

This application is the National Stage filing under 35 U.S.C. 371 of International Application No. PCT/KR2010/003966, filed on Jun. 18, 2010, which claims the benefit of U.S. Provisional Application Ser. No. 61/246,540, filed on Sep. 29, 2009, the contents of which are all incorporated by reference herein in their entirety.

TECHNICAL FIELD

The present invention relates to a wireless communication system, and more particularly to a method and apparatus for transceiving data in a wireless communication system.

BACKGROUND ART

Currently, a wireless communication system can enhance spectrum efficiency by optimizing a transmission mode of a mobile station in accordance with a channel status. However, the transmission mode of the mobile station may not be optimized depending on the channel status in the wireless communication system.

First of all, the transmission mode of the mobile station may not be optimized for an initial access process. In order to perform initial access, the mobile station transmits a preamble to a base station and waits for a random access response message. If the random access response message is received from the base station, the mobile station default request information to the base station. Then, the base station decodes the information received from the mobile station. In other words, since the base station does not know information on configuration or transmission mode of the mobile station for the initial access process, the mobile station transmits data in a default transmission mode.

However, the mobile station may select a proper transmission mode depending on a channel status and transmit data in accordance with the selected transmission mode, whereby frequency gain and diversity gain may be obtained.

Second, the transmission mode of the mobile station may not be optimized for a non-scheduled transmission process. The non-scheduled transmission is used for transmission of low latency or operation of a short active time of the mobile station. Since the base station cannot know information on configuration or transmission mode of the mobile station even for the non-scheduled transmission process, the mobile station transmits data in a default transmission mode, so that the base station may decode the data received from the mobile station.

For the initial access process and the non-scheduled transmission, the base station cannot know configuration of the mobile station and channel features. However, the mobile station may know channel features, and may select a proper transmission mode in accordance with channel features.

However, if the mobile station transmits data in a default mode regardless of the channel status for the initial access process and the non-scheduled transmission in accordance with the related art, a problem occurs in that resource efficiency is deteriorated.

DISCLOSURE

Technical Problem

As described above, according to the related art, a problem occurs in that system throughput is deteriorated during communication.

Accordingly, an object of the present invention devised to solve the conventional problem is to provide a method for transceiving data to enhance resource efficiency.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for receiving data in a base station of a wireless communication system comprises the steps of receiving a signal including data and information on a transmission mode, from a mobile station; and decoding the data in accordance with the transmission mode, wherein the transmission mode is selected by the mobile station in accordance with a channel status.

To solve the aforementioned technical problems, according to another aspect of the present invention, a method for transmitting data from a mobile station of a wireless communication system comprises the steps of selecting a transmission mode in accordance with a channel status; generating a signal including data and information on the transmission mode; and transmitting the signal to a base station in accordance with the transmission mode.

In this case, the information on the transmission mode may be transmitted through some region of resources allocated for transmission of the data.

Also, constellation phase of the signal may be determined in accordance with the transmission mode.

Also, the signal may include a demodulation reference signal, and a cyclic shift value of the demodulation reference signal may be determined in accordance with the transmission mode.

Also, the mobile station may transmit a preamble for initial access to the base station, be allocated with resources from the base station, and transmit the signal through the resources.

To solve the aforementioned technical problems, according to still another aspect of the present invention, a base station comprises a reception module receiving a signal including data and information on a transmission mode selected by a mobile station in accordance with a channel status, from the mobile station; and a processor decoding the data in accordance with the transmission mode.

To solve the aforementioned technical problems, according to further still another aspect of the present invention, a mobile station comprises a processor selecting a transmission mode in accordance with a channel status and generating a signal including data and information on the transmission mode; and a transmission module transmitting the signal to a base station in accordance with the transmission mode.

Advantageous Effects

According to the embodiments of the present invention, the mobile station selects an optimized transmission mode and notifies the base station of the selected transmission mode, whereby spectrum efficiency may be enhanced.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP2 802.16 system, the following description may be applied to other mobile communication systems except for unique features of the 3GPP2 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a terminal means a mobile or fixed type user terminal such as a user equipment (UE) and a mobile station (MS). It is also assumed that a base station means a random node of a network node, such as Node B and eNode B, which performs communication with a mobile station.

Figure 1:
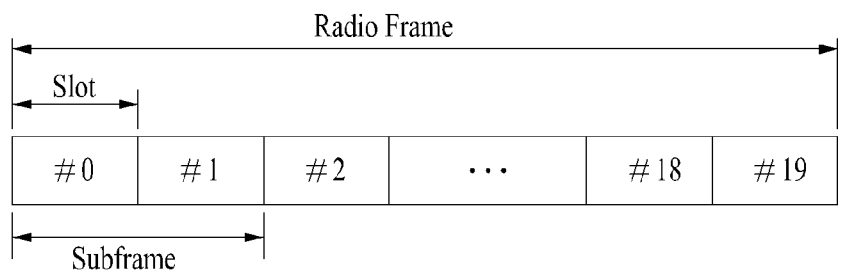
FIG. 1 is a block diagram illustrating an example of a frame structure of a wireless communication system.

First of all, a frame structure and a resource structure of the wireless communication system will be described with reference to FIGS. 1 and 2. FIG. 1 is a block diagram illustrating an example of a frame structure of a wireless communication system. As shown in FIG. 1, one frame includes ten subframes, each of which includes two slots. A time required to transmit one subframe will be referred to as a transmission time interval (TTI). For example, one subframe may have a length of 1 ms, and one slot may have a length of 0.5 ms.

One slot includes a plurality of orthogonal frequency division multiplexing (OFDM) symbols. The OFDM symbols may be referred to as SC-FDMA symbols or symbol interval.

One slot may include seven or six OFDM symbols depending on a cyclic prefix (CP) length. A long term evolution (LTE) system includes a normal CP and an extended CP. In case of a normal CP, one slot includes seven OFDM symbols. In case of an extended CP, one slot includes six OFDM symbols. The extended CP is used when delay spread is great.

Figure 2:
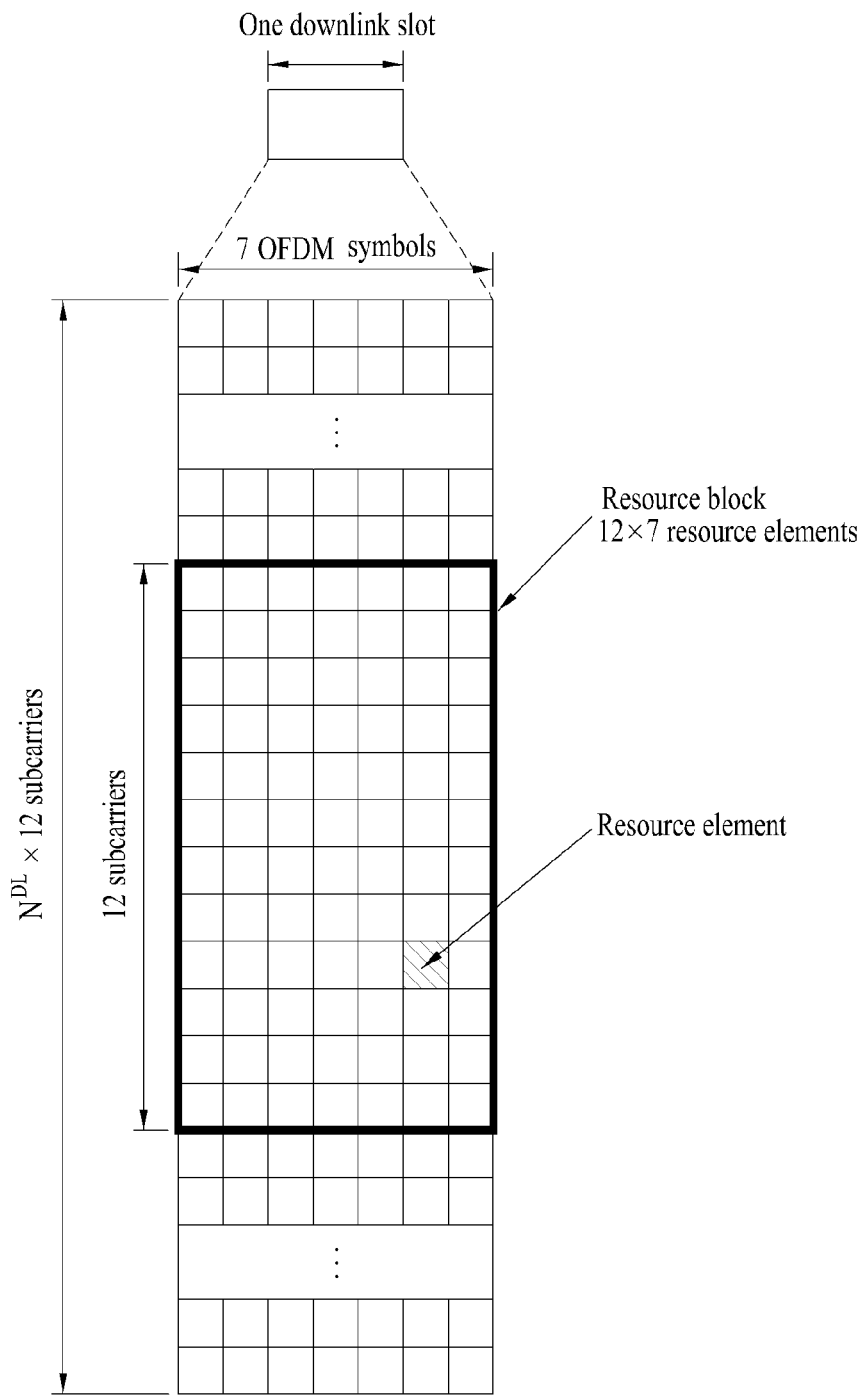
FIG. 2 is a diagram illustrating a resource structure of one downlink slot.

FIG. 2 is a diagram illustrating a resource structure of one downlink slot. Referring to FIG. 2, one slot includes seven OFDM symbols. A resource element (RE) is a resource region that includes one OFDM symbol and one subcarrier. A resource block (RB) is a resource region that includes a plurality of OFDM symbols and a plurality of subcarriers. For example, the resource block may include seven OFDM symbols in a time domain and twelve subcarriers in a frequency domain. The number of resource blocks included in one slot may be determined depending on a downlink bandwidth.

Figure 3:
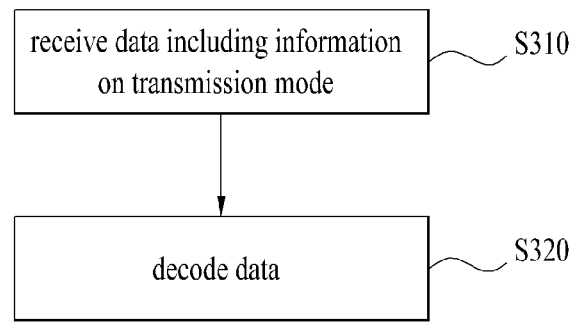
FIG. 3 is a diagram illustrating a method for transceiving data in accordance with the first embodiment of the present invention.

Next, a method for transceiving data in accordance with the first embodiment of the present invention will be described with reference to FIG. 3. FIG. 3 is a diagram illustrating a method for transceiving data in accordance with the first embodiment of the present invention.

As shown in FIG. 3, the base station receives data, which include information on at transmission mode, from the mobile station (S310).

If the mobile station selects a transmission mode suitable for a buffer status of the mobile station or a channel status, it should notify the base station of the transmission mode, whereby the base station decodes data. Accordingly, when transmitting data to the base station, the mobile station transmits the information on the selected transmission mode to the base station together with the data, wherein the information is included in the data.

In the first embodiment of the present invention, three methods for allowing the mobile station to include the information on the transmission mode in data will be suggested.

The first method is to map the information on the transmission mode into some symbols of the transmitted resources. In other words, the information on the transmission mode is transmitted using some of resource of time and frequency domains, which are allocated for data transmission. Symbols used to transmit the information on the transmission mode may be processed by rate matching or symbol puncturing.

The number of symbols used to transmit the information on the transmission mode may be fixed or varied. If the number of symbols used to transmit the information on the transmission mode is fixed, the mobile station may sense the transmission mode once.

If the number of symbols used to transmit the information on the transmission mode varied, a transmission mode indicator may include fixed information and variable information. For example, the fixed information is MIMO transmission index, and the variable information may be transmission related information such as precoding matrix, rank information and timing adjustment.

The second method is the method for using a symbol space, such as phase rotation or constellation realignment. The information on the transmission mode may be changed to constellation phase or realignment information. In other words, constellation phase may be varied depending on the transmission mode, and the base station may sense the transmission mode depending on the constellation phase. Channel coding may be determined depending on the structure of constellation. In other words, channel coding for QPSK, 16QAM and 64QAM may be defined by a specific format and parameter type. In this case, it is advantageous in that the base station may know channel coding information even though it detects constellation only. In other words, the base station may detect the transmission mode even though the mobile station neither changes phase coding nor uses constellation realignment. However, different channel coding types cannot be used for the same constellation.

The third method is the method for indicating a transmission mode using a demodulation reference signal (DM-RS).

The transmission mode may be represented by using cyclic shift of the DM-RS. For example, if M cyclic shifts exist and one DM-RS is used, M transmission modes may be provided. In other words, the mobile station transmits the DM-RS by cyclic shifting it in accordance with the transmission mode, the base station may know the transmission mode in accordance with the cyclic shift value of the DM-RS. For another example, if M cyclic shifts are provided and N DM-RSs are transmitted, $M*(M-1)* \ldots *(M-N+1)/(N*(N-1)* \ldots *1)$ transmission modes may be provided. The base station may easily sense the transmission mode through an energy sensing process of the DM-RS cyclic shift space.

If a plurality of DM-RS symbols are transmitted from one frequency domain, the mobile station may represent the transmission mode by phase shifting the DM-RSs of the respective OFDM symbols to other phase shifted values. Then, the base station may sense the transmission mode by comparing phase changes of the DM-RSs of the other OFDM symbols in the same frequency domain or comparing phase changes of the DM-RSs of other frequency positions in the same OFDM symbol.

Referring to FIG. 3, the base station decodes the received data in accordance with the sensed transmission mode (S320).

Figure 4:
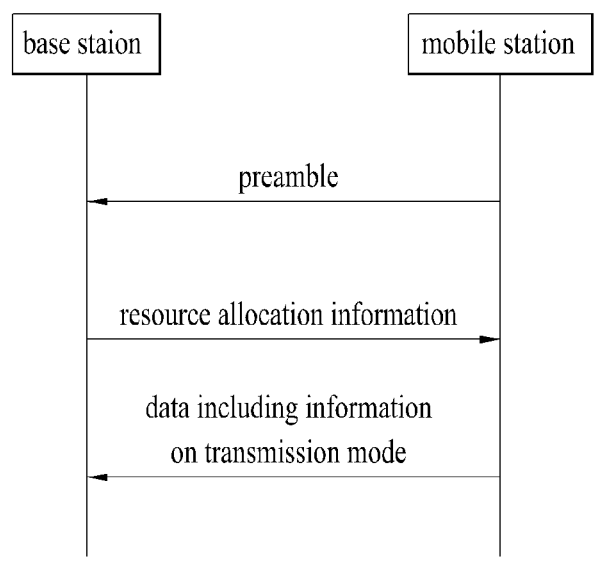
FIG. 4 is a diagram illustrating a procedure of transceiving data for an initial access process in accordance with the first embodiment of the present invention.

A procedure of transceiving data in the initial access process in accordance with the first embodiment of the present invention will be described with reference to FIG. 4. FIG. 4 is a diagram illustrating a procedure of transceiving data for an initial access process in accordance with the first embodiment of the present invention.

As shown in FIG. 4, the mobile station transmits a preamble to the base station to try initial access. Then, the base station that has received the preamble allocates resources to the mobile station and transmits resource allocation information to the mobile station.

Then, the mobile station transmits the data to the base station through the allocated resources. At this time, the information on the transmission mode are included in the data as described above.

In case that the mobile station performs non-scheduled transmission, it includes the information on the transmission mode in the data as described above when transmitting the data through the resources allocated for non-scheduled transmission.

Next, a method for transceiving data in accordance with the second embodiment of the present invention will be described.

According to the second embodiment of the present invention, the mobile station may indicate the transmission mode by using a random access preamble. In order to perform initial access, the mobile station transmits the preamble to the base station. At this time, if the preamble representing each transmission mode is previously defined, the mobile station selects the preamble in accordance with its transmission mode and transmits the selected preamble. Alternatively, random access physical resource such as time and frequency domains, root sequence and cyclic shift may represent the transmission mode.

However, it is difficult for the preamble or physical resource to represent the exact transmission mode. Accordingly, the mobile station may represent that its transmission mode is different from that of the related art, through the preamble or physical resource. In other words, the mobile station may represent that its transmission mode is not a default mode, by using the preamble or physical resource. For example, the LTE-A mobile station may represent that a random access procedure and transmission format are different from those of the LTE mobile station, by using the preamble.

Then, even though the base station does not know the exact transmission mode of the LTE-A mobile station, it may be on standby to receive the transmission signal format of the LTE-A mobile station, which is different from that of the LTE mobile station. In other words, the base station may transmit a random access response message different from that of the related art to the LTE-A mobile station. Then, the mobile station transmits data in accordance with a format indicated by the random access response message.

Figure 5:
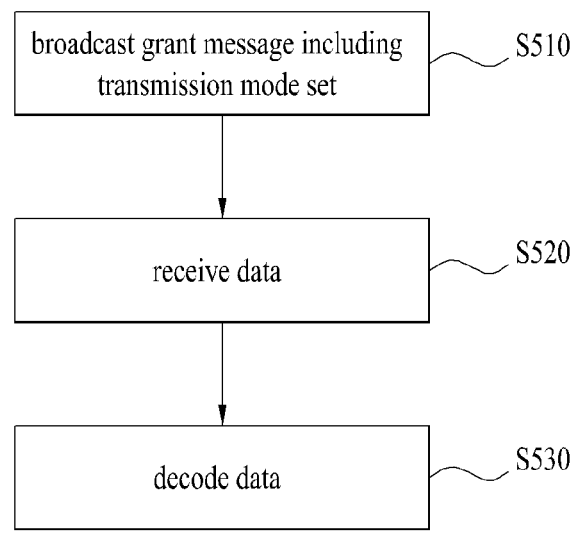
FIG. 5 is a diagram illustrating a method for receiving data in accordance with the third embodiment of the present invention.

Next, a method for transceiving data in accordance with the third embodiment of the present invention will be described with reference to FIG. 5. FIG. 5 is a diagram illustrating a method for receiving data in accordance with the third embodiment of the present invention.

As shown in FIG. 5, the base station broadcasts a grant message on uplink resource allocation (S510). At this time, the grant message includes a transmission mode set.

The mobile station that has received the grant message selects the transmission mode from the transmission mode set included in the grant message, in accordance with the channel status. And, the mobile station transmits data in accordance with the selected transmission mode.

Then, the base station receives the data from the mobile station (S520) and performs blind decoding for the received data (S530).

For the initial access procedure, the random access response may include the aforementioned grant message. In other words, if the mobile station transmits the preamble to the base station in accordance with the method described in the second embodiment, the base station transmits the random access response, which includes the aforementioned grant message, to the mobile station. At this time, resource allocation information may be interpreted differently depending on the physical resources. For example, a resource allocation field of the grant message may be the same as the grant message of the related art, or may represent distributed resource allocation having no hopping indication. In other words, a corresponding bit may be used for the other purpose of use (for example, transmission mode indicator).

Next, a method for retransmitting data in accordance with the fourth embodiment of the present invention will be described. In case of transmission of low latency, an adaptive transmission method is required. In order to perform adaptive transmission, a proper transmission style may previously be defined. For example, a hopping sequence of an uplink component carrier may be fixedly defined or signaled. If the uplink component carrier is not suitable for data transmission and the base station does not know such a status, the mobile station may retransmit the data by hopping the uplink component carrier, thereby obtaining frequency diversity gain. In other words, the mobile station changes the uplink component carriers on the basis of the hopping sequence. At this time, a candidate uplink component carrier may be fixedly defined in accordance with fixed offset, or may be signaled explicitly through the grant message.

Figure 6:
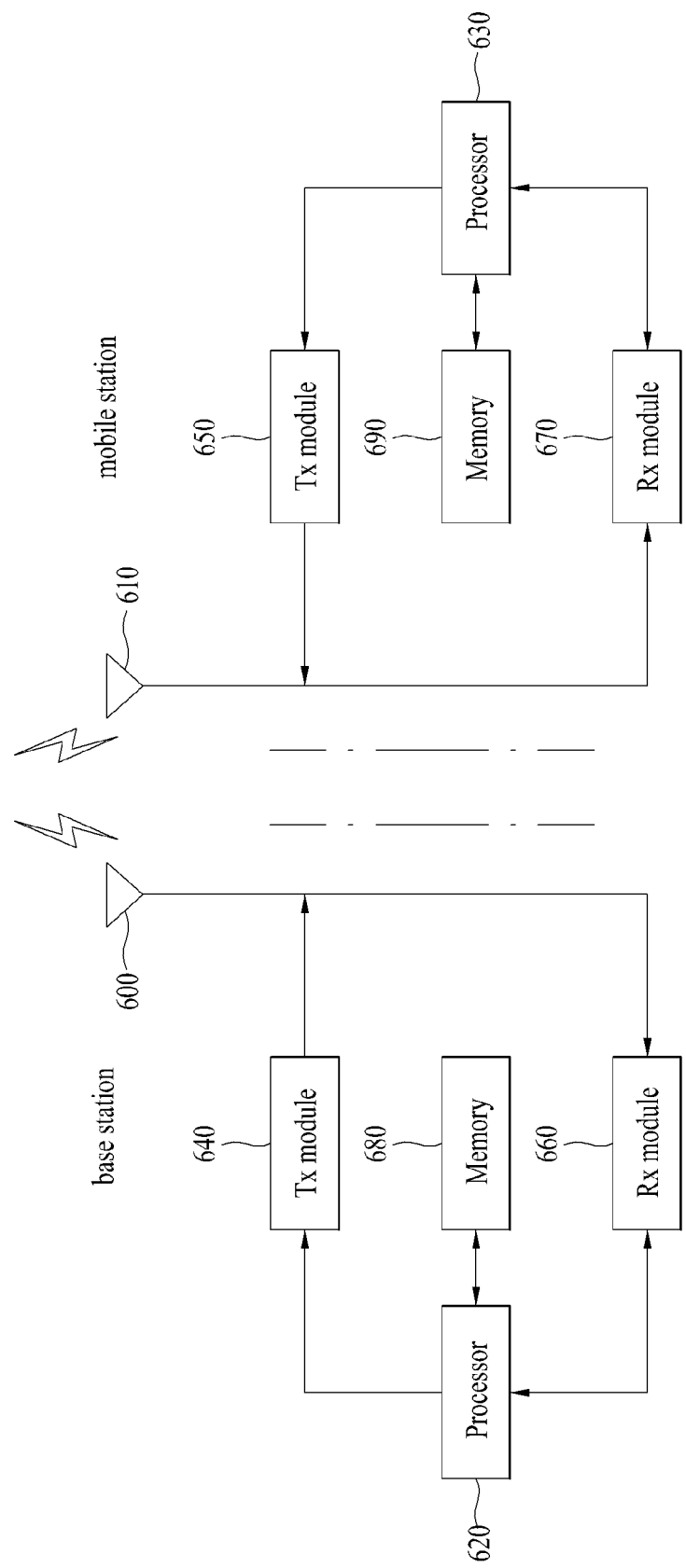
FIG. 6 is a diagram illustrating a configuration of a mobile station and a base station through which the embodiments of the present invention can be carried out.

FIG. 6 is a diagram illustrating a configuration of a mobile station and a base station through which the embodiments of the present invention can be carried out.

Each of the mobile station (AMS) and the base station (ABS) includes an antenna 600, 610 transmitting and receiving information, data, signal and/or message, a Tx module 640, 650 transmitting a message by controlling the antenna, an Rx module 660, 670 receiving a message by controlling the antenna, a memory 680, 690 storing information related to communication with the base station, and a processor 620, 630 controlling the Tx module, the Rx module, and the memory. At this time, the base station could be a femto base station or a macro base station.

The antenna 600, 610 serves to transmit a signal generated by the Tx module 640, 650 to the outside or receive a radio signal from the outside to transfer the radio signal to the Rx module 660, 670. If a MIMO antenna function is supported, two or more antennas may be provided.

The processor 620, 630 generally controls the whole operation of the mobile station or the base station. Particularly, the processor may perform a control function for performing the aforementioned embodiments of the present invention, a medium access control (MAC) frame variable control function based on service characteristics and propagation condition, a handover function, an authentication and encryption function, etc. Also, the processor 620, 630 may further include an encryption module for controlling encryption of various messages and a timer module controlling transmission and reception of various messages.

If the base station receives a signal, which includes data and information on a transmission mode selected in accordance with a channel status, the processor 620 of the base station decodes the received data in accordance with the received transmission mode.

If the base station receives a preamble from the mobile station which tries initial access, the processor 620 of the base station allocates resources to the mobile station.

The processor 630 of the mobile station selects the transmission mode in accordance with the channel status, and generates a signal, which includes the information on the transmission mode and data.

A method for generating a signal, which includes information on a transmission mode and data, may include three methods as described in the first embodiment of the present invention. The first method is the method for mapping the information on the transmission mode into some symbols of the transmitted resources. The second method is the method for using a symbol space such as phase rotation or constellation realignment. The third method is the method for indicating a transmission mode using a DM-RS.

The Tx module 640, 650 performs predetermined coding and modulation for signal and/or data, which are scheduled from the processor and then transmitted to the outside, and then transfers the coded and modulated data to the antenna 600, 610.

The Tx module of the mobile station transmits the signal, which is generated by the processor 630 of the mobile station in accordance with the transmission mode selected by the processor 630 of the mobile station, to the base station.

If the mobile station tries initial access, the Tx module 650 of the mobile station transmits the preamble for initial access to the base station. If the mobile station is allocated with resources from the base station, it transmits the signal, which includes the information on the transmission mode and data, to the base station through the allocated resources.

If the base station receives the preamble for initial access from the mobile station, it allocates the resources to the mobile station, and the Tx module 640 of the base station transmits resource allocation information to the mobile station.

The Rx module 660, 670 performs decoding and demodulation for the radio signal received from the outside through the antenna 600, 610 to recover original data and then transfer the recovered data to the processor 620, 630.

The Rx module 660 of the base station receives the signal, which includes the data and the information on the transmission mode selected by the mobile station in accordance with the channel status, from the mobile station. And, for the initial access procedure, the Rx module 660 of the base station receives the preamble for initial access from the mobile station.

The Rx module 670 of the mobile station receives resource allocation information from the base station for the initial access process.

The memory 680, 690 may store a program for processing and control of the processor, or may perform a function for temporarily storing input/output data (in case of the mobile station, UL grant allocated from the base station, system information, station identifier (STID), flow identifier (FID), action time, zone allocation information, and frame offset information).

Also, the memory may include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for performing an initial access to a base station by a user equipment in a wireless communication system, the method comprising:
   determining a transmission mode according to a channel status;
   transmitting a random access preamble to the base station, wherein, if the transmission mode does not correspond to a default transmission mode, the random access preamble is used to indicate that the transmission mode is not the default transmission mode;

receiving a random access response from the base station in response to the random access preamble, the random access response including resource allocation information; and transmitting data and transmission mode information using the resource allocation information, wherein the transmitting of the data and the transmission mode information includes puncturing at least one resource of resources indicated by the resource allocation information and mapping the transmission mode information into the at least one resource, wherein when a size of the at least one resource is fixed, the transmission mode information comprises only a transmission mode indicator, and wherein when a size of the at least one resource is varied, the transmission mode information comprises MIMO (multiple input multiple output) transmission index, precoding matrix information, rank information, and timing adjustment information.

2. A user equipment configured to perform an initial access to a base station in a wireless communication system, the user equipment comprising:

a transmission module for transmitting a signal the base station;

a reception module for receiving a signal from the base station; and a processor configured to:

determine a transmission mode according to a channel status, transmit a random access preamble to the base station, wherein, if the transmission mode does not correspond to a default transmission mode, the random access preamble is used to indicate that the transmission mode is not the default transmission mode, receive a random access response from the base station in response to the random access preamble, the random access response including resource allocation information, and transmit data and transmission mode information using the resource allocation information, wherein the transmitting of the data and the transmission mode information includes puncturing at least one resource of resources indicated by the resource allocation information and mapping the transmission mode information into the at least one resource, wherein when a size of the at least one resource is fixed, the transmission mode information comprises only a transmission mode indicator, and wherein when a size of the at least one resource is varied, the transmission mode information comprises MIMO (multiple input multiple output) transmission index, precoding matrix information, rank information, and timing adjustment information.

* * * * *